US011811887B2

(12) United States Patent
Rueckert et al.

(10) Patent No.: US 11,811,887 B2
(45) Date of Patent: Nov. 7, 2023

(54) HIGHLY AVAILABLE DELIVERY OF ORDERED STREAMS OF IOT MESSAGES

(71) Applicant: ABB Schweiz AG, Baden (CH)

(72) Inventors: Julius Rueckert, Langen (DE); Heiko Koziolek, Karlsruhe (DE); Sten Gruener, Laudenbach (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/702,123

(22) Filed: Mar. 23, 2022

(65) Prior Publication Data
US 2022/0311833 A1 Sep. 29, 2022

(30) Foreign Application Priority Data
Mar. 23, 2021 (EP) .................................. 21164231

(51) Int. Cl.
*H04L 67/51* (2022.01)
*H04L 67/562* (2022.01)
*G06F 9/455* (2018.01)
*H04L 1/1829* (2023.01)
*H04W 4/12* (2009.01)

(52) U.S. Cl.
CPC .......... *H04L 67/51* (2022.05); *G06F 9/45558* (2013.01); *H04L 1/1858* (2013.01); *H04L 67/562* (2022.05); *H04W 4/12* (2013.01); *G06F 2009/4557* (2013.01); *G06F 2009/45595* (2013.01)

(58) Field of Classification Search
CPC ..... H04L 67/41; H04L 67/562; H04L 1/1858; G06F 9/4555; G06F 2009/4557; G06F 2009/45595; H04W 4/12
See application file for complete search history.

(56) References Cited

U.S. PATENT DOCUMENTS

| 10,645,181 B2 | 5/2020 | Hoffner et al. | |
| 11,178,091 B1* | 11/2021 | Madhavan | H04L 47/622 |
| 2010/0124196 A1* | 5/2010 | Bonar | H04W 16/16 |
| | | | 455/445 |
| 2018/0309541 A1* | 10/2018 | Bauer | H04L 12/44 |

(Continued)

OTHER PUBLICATIONS

Rufino et al., "Sofware defined P2P architecture for reliable vehicular communications", Pervasive and Mobile Computing, Jun. 23, 2017, Elsevier Publishing.*

(Continued)

*Primary Examiner* — Todd L Barker
(74) *Attorney, Agent, or Firm* — Leydig, Voit & Mayer, Ltd.

(57) ABSTRACT

A method for conveying messages between a first software application in a first container and a second software application in a second container includes receiving, by a first connectivity service an ordered sequence of messages sent by the first application; transmitting, by the first connectivity service, at least two copies of each message to a second connectivity service, wherein the at least two copies are routed on at least partially redundant paths and wherein each copy is indicative of a position of the original message in the original ordered sequence; and forwarding, by the second connectivity service, at least one copy of each message to the second application, in the order given by the original ordered sequence.

19 Claims, 4 Drawing Sheets

(56) References Cited

U.S. PATENT DOCUMENTS

| | | | |
|---|---|---|---|
| 2019/0273746 A1* | 9/2019 | Coffing | G06Q 20/40 |
| 2019/0379597 A1 | 12/2019 | Kolding et al. | |
| 2019/0386779 A1 | 12/2019 | Hong et al. | |
| 2020/0220875 A1* | 7/2020 | Harguindeguy | H04L 63/1425 |
| 2020/0374205 A1* | 11/2020 | Sharma | H04L 67/12 |
| 2021/0152543 A1* | 5/2021 | Doshi | G06N 20/00 |
| 2021/0392477 A1* | 12/2021 | Taft | H04L 63/14 |

OTHER PUBLICATIONS

Liu et al., "A Toolset for Detecting Containereized Application's Dependencies in CaaS Clouds", IEEE 11th International Conference on Cloud Computing, Jul. 2, 2018.*

Frömmgen et al., "ReMP TCP: Low latency multipath TCP," *2016 IEEE International Conference on Communications (ICCL)*, 1-7 (May 22-27, 2016).

Dorow, "Flexible Fault Tolerance in Configurable Middleware for Embedded Systems," *Proceedings 27th Annual International Computer Software and Applications Conference (COMPSAC)*, IEEE, pp. 583-559 (Nov. 3-6, 2003)

European Patent Office, Extended European Search Report in European Application No. 21164231.9, 8 pp. (Sep. 21, 2021).

* cited by examiner

HIGHLY AVAILABLE DELIVERY OF ORDERED STREAMS OF IOT MESSAGES

CROSS-REFERENCE TO RELATED APPLICATIONS

This patent application claims priority to European Patent Application No. EP21164231.9, filed on Mar. 23, 2021, which is incorporated in its entirety by reference.

FIELD OF THE DISCLOSURE

The present disclosure relates to the delivery of ordered streams of messages in Internet of Things, IoT, applications, such as control and/or monitoring of industrial processes executed on industrial plants.

BACKGROUND OF THE INVENTION

Industrial applications increasingly adopt message-oriented middleware specifically designed for the Internet-of-Things. Such middleware (e.g., using MQTT brokers) can for example be used to carry out stream-processing of industrial plant data sent via Internet protocols, potential providing production optimizations during runtime. MQTT is used as example for a message-oriented middleware in this document, while other examples could be used (e.g. AMQP, DDS, XMPP, JMS).

MQTT specifies different quality-of-service (QoS) levels for message delivery. However, broker implementations greatly differ in their behavior, especially in case of broker instance failures. Clustered multi-instance broker implementations exist that aim to minimize the impact of broker instance failures. Experiments show that most of them are not able to achieve a reliable and ordered message delivery (no message loss, no message reordering) for QoS 1 (at-least-once delivery) messages. For applications that depend on a reliable and ordered message delivery, such as online stream processing applications, application developer have to two options: (1) rely on a specific broker implementation and trust its mechanism after intensive tests; (2) implement additional mechanisms as part of the application logic to compensate message loses and reordering (e.g. by introducing application-layer message sequence numbers and implementing retransmission and reordering mechanisms). For option (1), application developers need to trust in a reliable message delivery by the broker also, e.g., after software updates of the broker. Due to a missing end-to-end monitoring concept for such middleware-based deliveries, this requires extensive and repeated testing or contractual agreements with a broker vendor. Option (2), on the other hand, makes the implementation of applications more complicated and quickly leads to an undesired mixture of application and data delivery logic.

BRIEF SUMMARY OF THE INVENTION

The present disclosure is directed to a system and method that provides a highly available delivery of messages between software applications while at the same time untangling this delivery logic from application logic.

BRIEF DESCRIPTION OF THE SEVERAL VIEWS OF THE DRAWING(S)

In the following, the disclosure is supported using Figures without any intention to limit the scope of the invention.

DETAILED DESCRIPTION OF THE INVENTION

Figure 1:
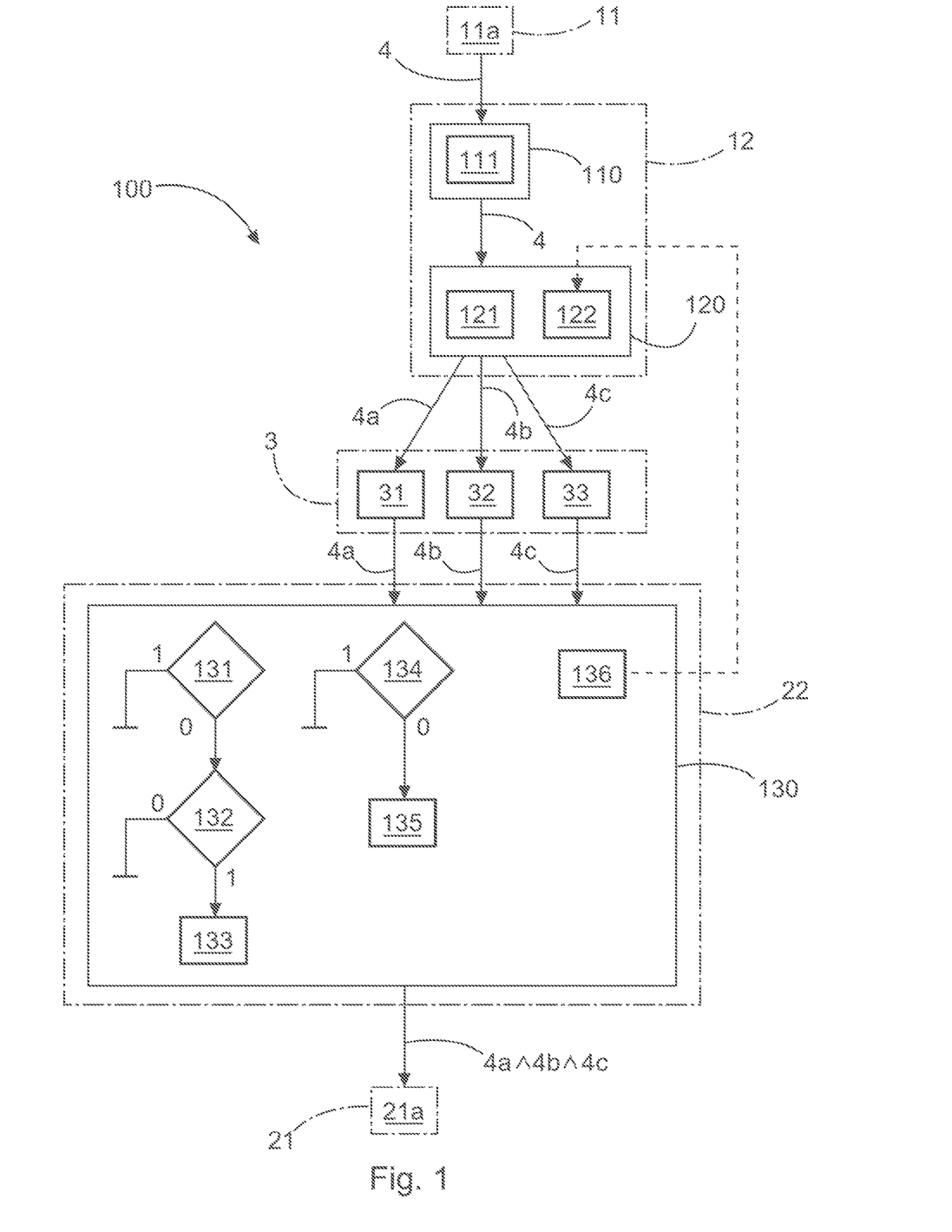
FIG. 1 is a schematic for an exemplary embodiment of a method for conveying messages from a first application to a second application, in accordance with the disclosure.

FIG. 1 is a schematic flow chart of an embodiment of the method 100 for conveying messages 4 from a first application 11a to a second application 21a. In step 110, a first connectivity service 12 receives messages 4 from a first application 11a that is executed in a first container 11. According to block 111, this first connectivity service 12 may also be used to block incoming messages destined for the first application 11a, thereby implementing a "data diode" that allows a flow of data only in one direction.

In step 120, the first connectivity service 12 transmits at least two copies 4a-4c of each message to a second connectivity service 22. This second connectivity service 22 is associated with a second container 21 in which a second application 21a is executed. According to block 121, the messages 4 may be aggregated for transmission to the second connectivity service 22. According to block 122, every message received from the first application 11a may be buffered until receipt of at least one copy 4a-4c of the message is acknowledged by the second connectivity service 22.

In the example shown in FIG. 1, the copies 4a-4c of the message 4 are routed to the second connectivity service 22 through different instances 31-33 of a middleware broker in a broker arrangement 3. That is, the paths on which the copies 4a-4c are routed are at least partially redundant in that the unavailability of one broker instance 31-33, or the dropping of a copy 4a-4c by one broker instance 31-33, will not deprive the second connectivity 22 of all copies 4a-4c of any particular message 4.

In step 130, the second connectivity service 22 forwards at least one copy of each received message 4 to the second application 21a, in the order given by the original ordered sequence outputted by the first application 11a. In the example shown in FIG. 1, only the copy 4a-4c that has been received first by the second connectivity service 22 is forwarded to the second application 21a.

According to block 131, it may be checked whether a copy 4a-4c of a first message 4 that is next to be forwarded to the second application according to the original ordered sequence has been received by the second connectivity service 22 already. If this is not the case (truth value 0), it is then checked in block 132 whether a copy 4a-4c of a second message 4 that is later in the original ordered sequence has already been received. If this is the case (truth value 1), this second message 4 is buffered in block 133 until the first message 4 that has to be forwarded next has been received and forwarded to the second application 21a.

According to block 134, it may be checked whether a copy of a message 4 that is next to be forwarded to the second application 21a according to the original ordered sequence has been received by the second connectivity service 22 within a predetermined deadline after the previous message 4 has been forwarded to the second application 21a. If this is not the case, retransmission of this message is requested in block 135.

According to block 136, the receipt of every message 4 from the first connectivity service 12 may be acknowledged by the second connectivity service 22.

Figure 2:
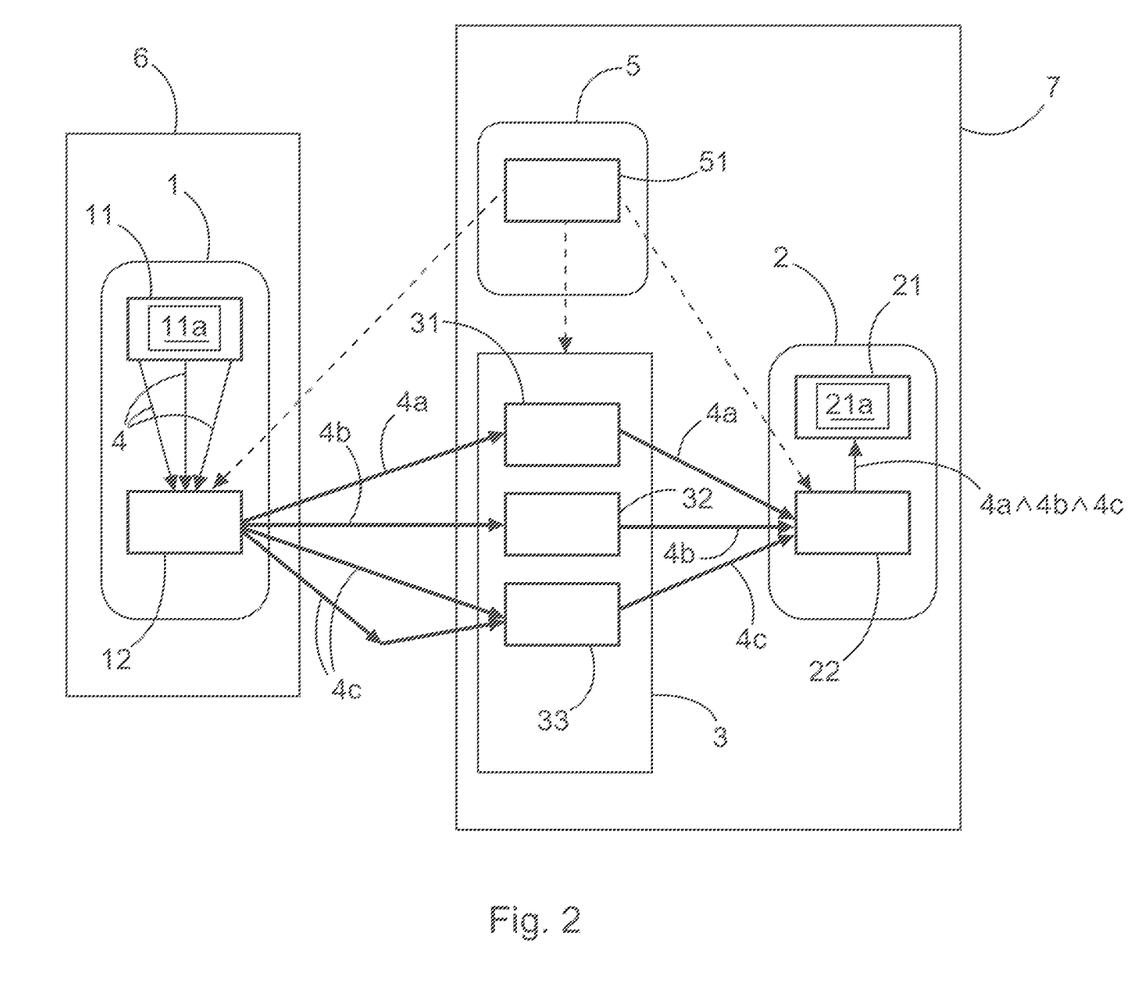
FIG. 2 is a schematic of an exemplary implementation of the method on an IoT edge gateway and a cloud computing platform, in accordance with the disclosure.

FIG. 2 shows an exemplary implementation of the method 100 on an IoT edge gateway 6 and a cloud computing platform 7. The IoT edge gateway 6 is on the premises of an industrial plant on which an industrial process is executed. The cloud computing platform 7 is remote from the industrial plant.

The first application 11a ingests data captured by sensors during execution of the industrial process. The container 11 with the first application 11a and the first connectivity service 12 are deployed in one common pod 1 on the IoT edge gateway 6.

The first connectivity service routes copies 4a-4c of each message 4 to three different broker instances 31-33 of a broker service 3 on a cloud computing platform 7. In the example shown in FIG. 2, the copy 4c is routed to the broker instance 33 through a network using multi-path delivery for added redundancy. That is, in addition to using redundant broker instances 31-33 implemented as IoT hub instances in this example, also redundant network paths (e.g. wired and mobile network) are used in combination with redundant MTCP transport paths. This shows a complex deployment scenario where redundancy on complementing levels is realized.

The copies 4a-4c of each message 4 are passed from the broker instances 31-33 to the second connectivity service 22. Akin to FIG. 1, one copy is then forwarded to the second application 21a that is being executed in the second container 21. The second container 21 and the second connectivity service 22 are deployed in one common pod 2 on the cloud computing platform 7.

The first and second connectivity services 12 and 22 are managed by a centralized management entity 51 that is deployed in its own pod 5 on the cloud computing platform 7. This centralized management entity 51 also monitors the broker arrangement 3.

Figure 3:
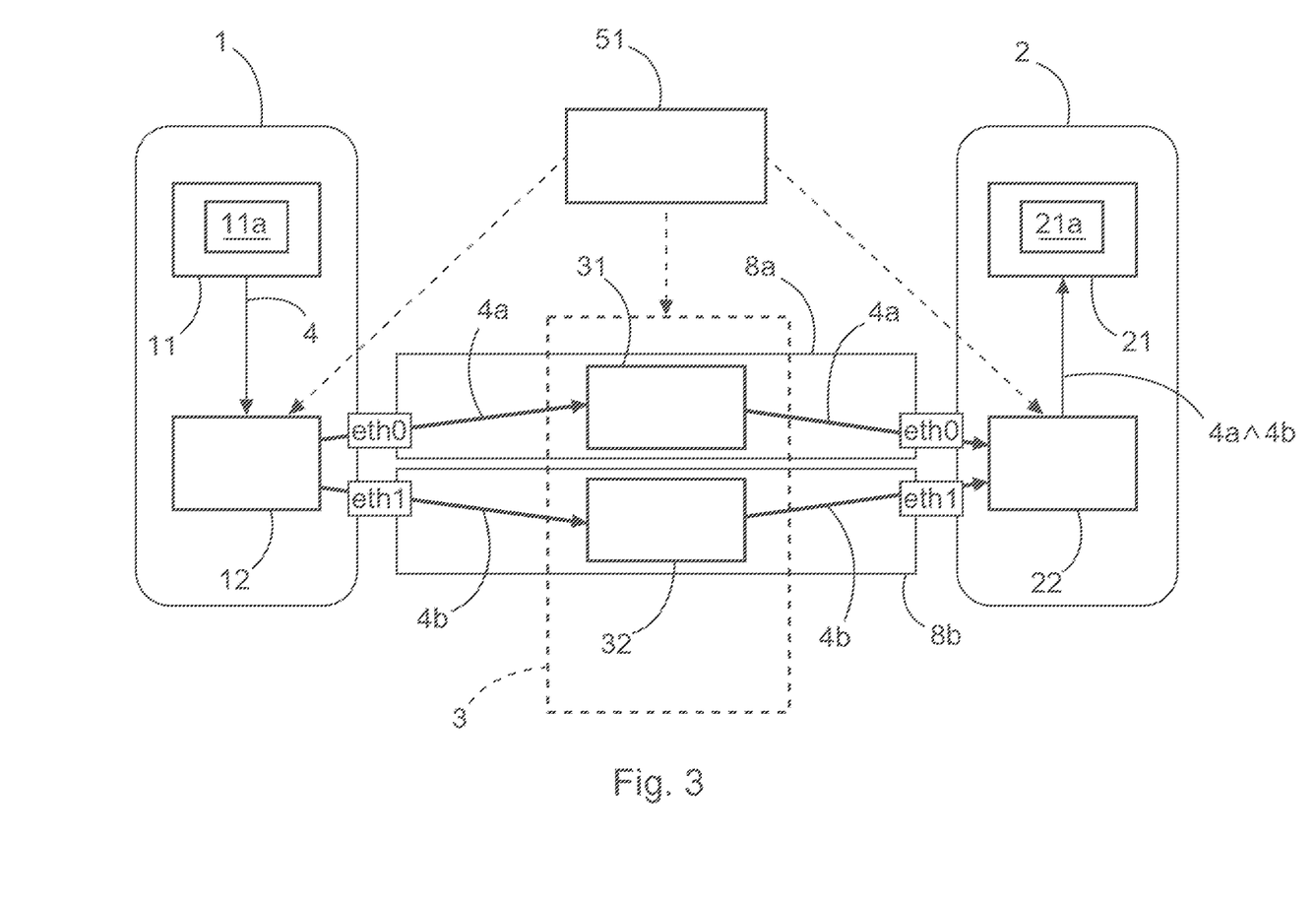
FIG. 3 is a schematic for an exemplary implementation of the method with diversity between two networks, in accordance with the disclosure.

FIG. 3 shows another exemplary implementation of the method 100 with network-layer redundancy. In case redundant networks 8a, 8b are available, connectivity services 12, 22 connected to these networks using distinct interfaces eth0, eth1 can use these networks 8a, 8b to further increase the reliability of the delivery. In this case, the redundant brokers or broker networks 31, 32 may be operated in different networks 8a, 8b. This has the advantage that a resilience against network failures is increased in that different physical network paths or technologies might be leveraged. In a containerized environment, the network interfaces eth0, eth1 need to be exposed to the application pods 1, 2 and used by the connectivity services 12, 22. These might be physical or virtual network interfaces and can map, e.g., to different Ethernet networks or even different network technologies, such as wired and wireless technologies. Alternatively, also additional redundancy mechanisms, such as the use of multipath-TCP (MTCP) can be used to make use of different network interfaces and delivery paths, while avoiding a redundant broker setup. In this case, an MTCP session may be established with a broker instance using redundant delivery paths using the MTCP extension ReMP TCP.

Figure 4:
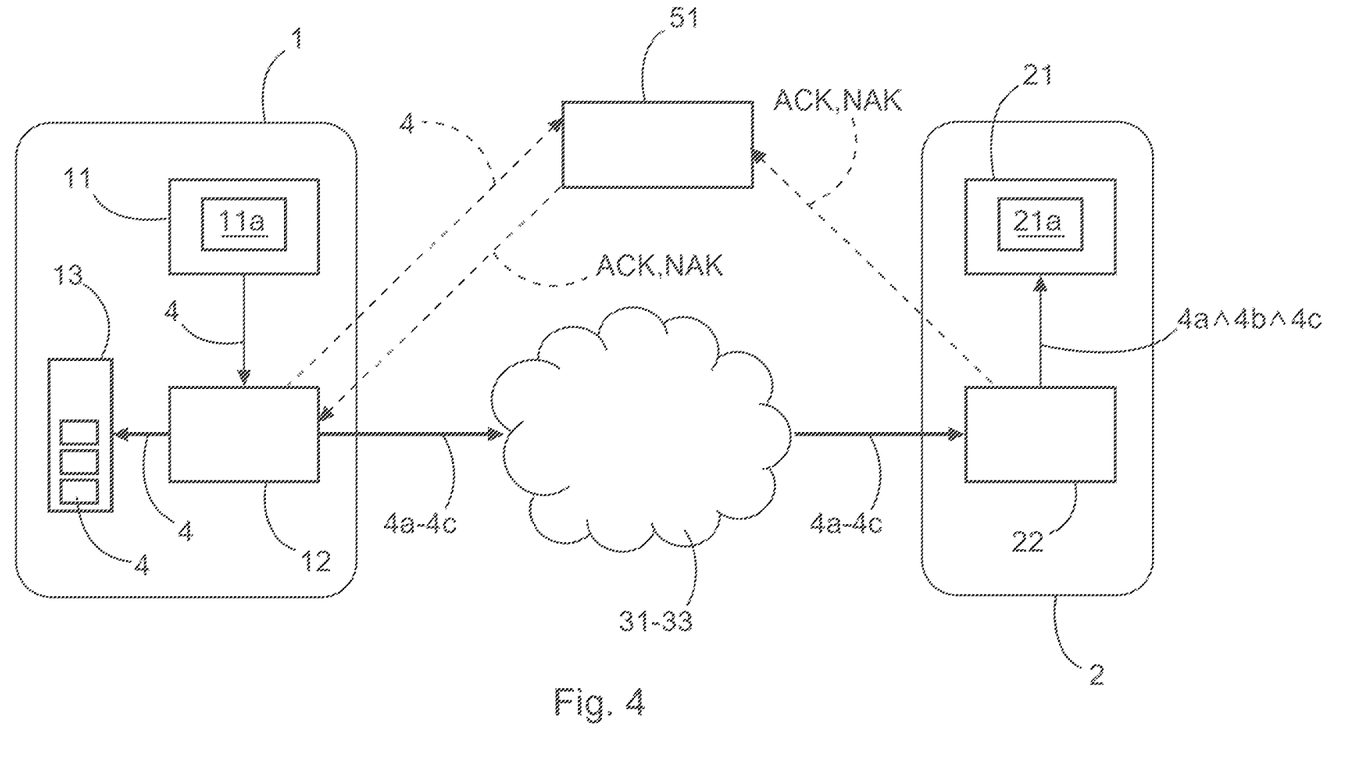
FIG. 4 is a schematic for an exemplary implementation of the method with acknowledgement of receipt of messages, in accordance with the disclosure.

FIG. 4 shows another exemplary implementation with acknowledgement of receipt of messages 4. In this example, the second connectivity service 22 acknowledges the receipt of a copy 4a-4c of every message 4 with an ACK to the centralized management entity, and requests retransmission of a fresh copy with a NAK in case no copy 4a-4c of a particular message 4 has arrived within a predetermined deadline from the forwarding of the last message 4 to the second application 21a.

The centralized management entity 51 is informed about the existence of every message 4 by the first connectivity service 12, e.g., by means of a message ID. The centralized management entity 51 transmits the ACKs it has received from the second connectivity service 22 to the first connectivity service 12 in an aggregated form, together with individual NAKs received from the second connectivity service 22. The first connectivity service 12 keeps a copy of each message 4 in a buffer 13 in pod 1 until receipt of at least one copy 4a-4c of this message 4 has been acknowledged by the second connectivity service 22.

In one general aspect, the disclosure describes a method for conveying messages between a first software application in a first container and a second software application in a second container. Herein, the term "container" comprises any suitable virtualized and/or compartmentalized execution environment in which an application may run. For example, containers and pods in a Kubernetes framework may be used.

In the course of the method, a first connectivity service associated with the first container receives an ordered sequence of messages sent by the first application. This first connectivity service transmits at least two copies of each message to a second connectivity service associated with the second container. The at least two copies are routed on at least partially redundant paths. This means that on at least one leg, and/or at least one station, of the journey from the first connectivity service to the second connectivity service, the at least two copies are handled and/or transported by different hardware and/or software entities, so that a failure of one such entity will not cause both copies to be lost.

Partially redundant paths do not need to be completely disjoint. They might use the same network interfaces and network connectivity, for example, but then use different broker IP addresses and broker instances to deliver the redundant messages. In very strict setups, two different network interfaces and physical networks are used.

Each copy of the message is indicative of the position of the original message in the original ordered sequence. This means that even if copies of different messages should arrive at the second connectivity service out of sequence, the second connectivity service still knows in which order they need to be forwarded to the second application.

The second connectivity service forwards at least one copy of each message to the second application, in the order given by the original ordered sequence. It depends on the desired QoS level of the concrete use case whether multiple copies of one and the same message may be forwarded to the second application.

In the MQTT nomenclature of QoS levels, QoS level 1 means that at least one copy of the message is forwarded. Therefore, multiple copies of one message may be forwarded to the second application before a copy of a new message that is next in the original ordered sequence is forwarded. But once this copy of a new message has been forwarded, further copies of the previous message that might arrive late at the second connectivity service are no longer forwarded. One example of data for which delivery in QoS level 1 may be appropriate is a stream of measurement values from a sensor. It is important that every measurement value arrives at the second application, and that the measurement values arrive in the right order, so that the second application may react to the measurement values including a temporal trend. But if the measurement values arrive at the second application in duplicate, this will not impede the work of the second application.

QoS level 2 in MQTT nomenclature means that exactly one copy of the message is forwarded. Thus, when the second connectivity service receives a first copy of one message, it may forward this copy of the message to the second application and discard all further copies of this message that arrive later. One example of data for which delivery in QoS level 2 may be appropriate is a command to actuate a toggle switch that toggles a valve between the open and closed states. Here, the effect of the first copy of the message would be negated if a second copy of this message was forwarded to the second application. Another example is a command to start up a combustion engine with an electric starter. A second attempt to start the engine while it is already running may damage the motor and/or the starter.

The multipath delivery greatly improves the reliability of the conveying of the stream of messages. Because the order of the messages matters, if one single message is completely lost, the further delivery of messages to the second application is halted altogether. It is not possible to proceed with delivering other messages to the second application, so that it can keep working with that data, and furnish the lost message later once a fresh copy of it has been obtained. It is therefore advantageous to reduce the probability that messages are lost or delayed.

At the same time, no change to the first or second application is necessary. From the perspective of these applications, messages emanating from the first application simply arrive at the second application in the right order and with a high reliability as if the two containers in which the applications are deployed were connected by a high quality "virtual cable". Thus, the method may also be used with "black box" applications for which no source code is available. Examples include control applications for field devices or other pieces of equipment that are migrated from industrial controller hardware to virtualized containers.

Also, the first and second connectivity service may enable legacy applications to communicate over newer networks and protocols, and even to specifically leverage more advanced features of these newer networks and protocols. For example, a control software originally written for communicating over HART, Modbus or another fieldbus protocol may now be enabled to communicate over the MQTT protocol, and different types of messages emanating from the control software may be mapped to the different QoS levels that MQTT has to offer.

Generally, it is advantageous to perform the communication between the first and second connectivity service by means of a middleware broker. For example, such a middleware broker may implement and/or manage a publish/subscribe communication model.

In a particularly advantageous embodiment, at least two of the at least partially redundant paths may pass through
 different instances of a middleware broker that is configured to manage publish/subscribe communication between software applications; and/or
 different routes within a network; and/or
 different hardware interfaces to a network;
 different communication protocols; and/or
 different networks.

All these components represent points of failure that may cause a copy of a message to get lost. In particular, middleware brokers, such as MQTT brokers, are a source of error because they tend to be under very high loads of simultaneous connections. Even if the software of the broker itself is not faulty, an execution environment in which the broker instance is deployed might suffer from temporary resource exhaustion, such as memory, a maximum number of concurrent processes, or a maximum number of simultaneously open network connections.

To increase the resilience, the different instances of a middleware broker may be obtained from different suppliers, and/or chosen such that they have been programmed differently. In this manner, if one copy of a particular message causes a problem or a crash in one instance, it is unlikely that another copy of this particular message will cause the same problem or crash in the other instance. For example, there may be a programming error in one instance that causes a buffer overflow when handling certain messages.

Temporary delays in the delivery of messages through a network, or temporary bottlenecks in the processing by a middleware broker, may cause a situation where a copy of a first message that is next to be forwarded to the second application according to the original ordered sequence is delayed, but a copy of a second message that is later in the original ordered sequence arrives on time. If no copy of the first message has yet been received by the second connectivity service, but a copy of a second message that is later in the original ordered sequence has already been received, preferably, the second connectivity service buffers the second message until the first message has been received and forwarded to the second application. In this manner, the order in which the second application receives the messages is restored without having to communicate back to the first connectivity service or another entity.

Preferably, if a copy of a message that is next to be forwarded to the second application according to the original ordered sequence is not received by the second connectivity service within a predetermined deadline after the previous message has been forwarded to the second application, the second connectivity service requests retransmission of this message. In this manner, a fresh copy of a missing message may be proactively procured, so that a dead time during which the second application can no longer process further messages is minimized.

In a further advantageous embodiment, the second connectivity service may acknowledge the receipt of every message from the first connectivity service. The first connectivity service may buffer every message from the first application until receipt of at least one copy of this message is acknowledged by the second connectivity service. In this manner, an even stricter guarantee may be provided that each and every message from the first application reaches the second application. The first application does not need to monitor whether its messages are all received well. It can simply assume that it is connected to the second application by a perfect "virtual cable". In particular, this avoids the complexity of providing a guarantee for the delivery of messages from "contaminating" the first application that is generating the content of these messages. There is no intermixing of the software that generates the content and the software that ensures the delivery. Keeping a clear distinction between pieces of software that perform different functions is good practice for avoiding software bugs, especially during software development. For example, it can be avoided that an attempt to improve the one functionality inadvertently introduces a bug in the other one. One example of an application where delivery of each and every message in the right order is of particular importance is a fly-by-wire system in an aircraft. For example, if the command to reduce airspeed for landing is executed, but a previous command to deploy flaps did not come through, the aircraft may experience stall and loss of lift.

Acknowledgements and/or requests for retransmission may, for example, be forwarded from the second connectivity service to the first connectivity service by a centralized management entity. For example, this management entity may keep track of all messages sent by the first connectivity service and their successful delivery. This function of the management entity is in some way analogous to the function of a post office that keeps track of registered letters or parcels.

Alternatively or in combination to this, a centralized management entity may be used to instantiate and/or manage the first and/or second connectivity service, and/or to monitor one or more instances of a middleware broker to check whether these instances are working properly.

In a further advantageous embodiment, the first connectivity service aggregates multiple messages from the first application for transmission to the second connectivity service. Herein, "aggregating" comprises every kind of processing that derives, from a the content of a given set of messages, a reduced number of messages. One example of aggregating is wrapping the content from the given set of messages into one message. E.g., by combining the content from several small messages into one larger message, protocol and other overhead may be saved. Also, assuming that every transmitted message has the same non-zero chance of getting lost, the chance that this combined message is transmitted successfully is increased. Another example of aggregating is forming an average from a series of measurement values, such as a temperature.

In a further advantageous embodiment, the first connectivity service blocks incoming messages destined for the first application. In this manner, the first connectivity service acts as a "data diode" that provides additional protection to the first application when exposing it to a network. The first application cannot be taken over by hostile commands from the network. For example, a control application that was originally developed for running on a hardware controller may never have been intended to be exposed to a network. Therefore, it may not have been programmed with security against hostile inputs in mind, and contain buffer overflows or other vulnerabilities with which its control flow may be taken over.

In a further advantageous embodiment, the first connectivity service may be a sidecar associated with the first container in a first pod, and/or the second connectivity service may be a sidecar associated with the second container in a second pod. For example, pods and sidecars from the Kubernetes framework may be used. In the context of Kubernetes, a sidecar is a special container that provides an interface to an application in another container in the pod. The sidecar manages communication between the application and any entities outside the pod. In a more generic context, a pod may be used to group multiple containers that are in some way dependent on each other. For example, a pod may comprise a first container for processing video data and a second container for ingesting the video data from a network.

In this manner, the connectivity services still run independently from the respective applications, but by virtue of being in the same pod, they may share some common resources, such as file systems or namespaces. Also, in a virtualized environment, everything that is in the same pod will run on one and the same node. Therefore, when messages are passed from the first application to the first connectivity service, or from the second connectivity service to the second application, they will be communicated within the respective node and not over a network. For communication within one and the same node, it may be safely assumed that the messages in an ordered stream all come through in the correct sequence.

Similarly, other deployment options may be used to achieve the same. Multiple pods might be grouped further, for example, in terms of Kubernetes Deployments. In this case, the connectivity service may be realizes as pods of the deployment instead of sidecar containers offering similar services as the described sidecar deployment option. Due to the reasons mentioned in the last paragraph, these pods may be deployed on the same physical node.

Thus, in a further advantageous embodiment, the first connectivity service is deployed in a separate pod on a same physical node as the first pod with the first container, and/or the second connectivity service is deployed in a separate pod on a same physical node as the second pod with the second container.

In a further advantageous embodiment, the first container may be deployed on an Internet of Things, IoT, edge gateway of an industrial plant. The first application may then be configured to receive sensor data captured during the execution of an industrial process by the plant. The highly available conveying of messages to a second application that processes the sensor data then allows a higher degree of freedom regarding the placement of a second container with the second application. This container may reside on the same edge gateway. But depending on which hardware resources are needed for the processing (e.g., GPUs, FPGAs or other hardware accelerators), and how much of these resources is needed, it may be advantageous to offload part or all of the processing to a second edge device or into the cloud. Because of the high availability for the communication provided by the present method, this offloading does not come at the price that the processing may be disrupted by loss of one or more messages from the ordered sequence.

Therefore, in a further advantageous embodiment, the second container, and/or at least one instance of a middleware broker that is configured to manage publish/subscribe communication between software applications, is deployed on a second edge device or a cloud computing platform that is remote from the industrial plant.

The methods may be wholly or partially computer-implemented. The invention therefore also provides one or more computer programs with machine readable instructions that, when executed on one or more computers, cause the one or more computers to perform a method described above. In particular, a virtualization platform and one or more hardware controllers may be regarded as computers.

The invention also provides one or more non-transitory storage media and/or download products with the one or more computer programs. A download product is a product that may be sold in an online shop for immediate fulfillment by download. The invention also provides one or more computers with the one or more computer programs, and/or with the one or more non-transitory machine-readable storage media and/or download products.

The invention realizes a multi-path message delivery mechanism that is transparent to applications. It leverages design diversity in that it aggregates multiple middleware instanced, such as multiple messaging brokers, and combines them into a single resilient and dependable transport mechanism. The instances used can be, e.g., different software versions of the same broker or even brokers provided by different vendors. By transmitting messages redundantly via multiple delivery paths, the likelihood of lost messages can be reduced drastically. In addition, fluctuations in delivery delays can be reduced by delivering the first message copy received to the application without waiting for a temporarily slower delivery path. To optimize for delays, the solution can leverage multiple messaging QoS classes in parallel. For example, it can establish a QoS 0 MQTT session to achieve low latency, while in parallel reliably transmitting copies via QoS 1 or QoS 2 session(s). This way, the application experiences a reliable QoS 1/2 session with, in best case, QoS 0 delays. Additional delivery path diversity can be achieved by using diverse network paths. Redundant physical network paths (e.g. two Ethernet networks) might be used, different network technologies (wireless and wired), or multipath transport mechanisms (e.g. multipath TCP).

By implementing the delivery mechanism external to the application, the solution is reusable for any application using the message-oriented middleware communication and does not complicate the application implementation. The solution ensures an in-order message delivery and enables other advanced delivery mechanisms, such as message aggregation. For this, buffering of messages before and after the delivery is done.

By combining the described mechanisms, the solution enables to cope with hardware and software failures and enables a resilient message delivery also demanding industrial application use cases.

The primary use case of the invention is its use in containerized systems, where the delivery mechanisms may be implemented, e.g., as a sidecar container offering transparent connectivity services to application containers. Alternatively, it may be implemented as hardware appliance that offers the connectivity service to applications running on different devices in form of a gateway or proxy functionality. In both deployment options, the connectivity service behaves like, e.g., an MQTT broker to the applications.

The method in accordance with the present disclosure provides at least the following advantages:
Multipath delivery for message-oriented middlewares (e.g. MQTT) with ordered, reliable, and low-latency message delivery;
Dynamic delivery mechanism that automatically compensates for delivery path or broker instance failures;
Implementation transparent towards application and no changes to commercial off-the-shelf, COTS, middleware implementations or brokers required;
Use of network-path diversity is integral part of solution (e.g. messages can be delivered via redundant or heterogeneous networks);
Transparent support for message aggregation, message batching, and protocol translation mechanisms;
Reliable message transport without depending on a single (broker) implementation (enables design diversity and multi-vendor strategy);
Potential to leverage middleware and broker ecosystem without depending on specific vendor or implementation;
Avoid complexity of implementing transport-related recovery mechanisms as part of application logic;
Leverage management feature and capabilities of cloud-native and container orchestration environments to realize reliable (MQTT-based) communication;
Namur Open Architecture, NOA data diode concept can be realized as integral part of the method.

Key ideas of the present disclosure include:
Transparent end-to-end redundancy mechanisms for data delivery services using message-oriented middleware (e.g. MQTT);
Multi-QoS-level redundancy concept to achieve low-latency message delivery with strong delivery guarantees;
Mechanisms to leverage path and delivery mechanisms diversity to achieve low-delay reliable communication channel (e.g. MQTT QoS 1/2 delivery with QoS 0 delay);
Flexible delivery mechanism and concept that can include advanced messaging mechanisms, such as batching, aggregation, data flow policies (e.g. NOA data diode concept), or translation between delivery mechanisms (MQTT-AMQP bridging).

In the foregoing, exemplary embodiments are described without any intention to limit the scope of the invention.

Applications use a locally deployed connectivity service to deliver application messages. This service acts, e.g., like an MQTT broker. In this case, the service is a broker proxy that maintains the actual (MQTT) session with external brokers. For other middleware examples, other kind of sessions might be maintained by the service. As mentioned before, the connectivity service can be deployed as sidecar container in a container orchestration system, a software service, or as dedicated hardware device in other setups.

For QoS 1 and QoS 2 MQTT sessions established by an application, the service establishes a set of redundant MQTT sessions with a list of dynamically managed external brokers for each MQTT topic the application uses. A central coordinator, the sidecar manager, manages the assignment of topics to broker instances and ensures that connectivity sidecars handling the same topic are connected to the same external redundant broker instances for these topics. To achieve the desired resilience against broker instance failures, it ensures that messages of each QoS 1 or 2 topic are delivered via at least two external brokers. This implies that the connectivity sidecar duplicates incoming messages of these topics and delivers them to the brokers defined by the sidecar manager. The receiving service does a de-duplication of messages, buffers out-of-sequence messages and delivers messages in an ordered fashion to the subscribing application. The assignment of topics to broker instances is handled dynamically by the sidecar manager and can change during runtime, e.g., to compensate for failing external broker instances.

To achieve low-latency deliveries, while maintaining the delivery guarantees, the connectivity sidecars can be configured by the sidecar manager to additionally distribute MQTT messages of QoS 1/2 application sessions internally via QoS 0 sessions. While this approach obviously implies additional overhead in terms of network load and CPU utilization, it also has some striking advantages. One is that brokers/broker networks do not need to maintain message queues and wait for the acknowledgement of message deliveries that would negatively impact the delivery delay. In case of QoS 1 sessions, this reduces the delivery delay by about one round-trip time for each forwarding hop in the broker network, while for QoS 2 messages even two round-trip times can be saved. In a broker network, the two-way and four-way handshakes necessary for QoS 1 and QoS 2, respectively, are necessary for each forwarding hop among broker instances, which implies potentially high delay reductions. The delivery on the QoS 0 delivery path happens with best-effort delivery guarantees with low-latency. In case of missing and reordered packets, the receiving connectivity sidecar waits for the slower QoS 1/2 deliveries. This means that as long as the QoS 0 delivery works smoothly and does not experience any bottlenecks and, thus, also no messages are lost, applications experience QoS 1/2 sessions with QoS 0 delivery delays. Only in case of message losses, which is possible for QoS 0 (at most once delivery) in case of broker failures, a fallback to QoS 1/2 delivery delays happens.

It is to be noted that for the sidecar implementation, application containers themselves require no modifications as all described functionality is transparently realized as part of the sidecar. Depending on the application and its configuration possibilities, the sidecar can even act as proxy to external brokers. This, however, assumes that security mechanisms are also implemented outside of the application, as typically assumed for sidecar setups. In case security mechanisms are used within the application (e.g. hard-coded certificates for external broker authentication), a use of the solution can be limited or require the application to trust certificates of the redundancy mechanism and its sidecars. This seems feasible but is not further discussed here.

In addition to the redundant delivery mechanisms, the connectivity sidecars may be used to implement complementary features. A key functionality is the reordering of messages before delivering them to the receiving application. For this purpose, connectivity sidecars buffer messages and only deliver them to the application once all preceding messages have been delivered. As mentioned before, for this, application-layer sequence numbers may be used. Depending on the expected reordering, the size of the buffer could imply a substantial overhead and slow down the message delivery. A careful tuning of acceptable buffer size configurations might be required along with application-specific policies on the delivery of incomplete buffers. For strict stream-processing applications larger buffer sizes in combination with a retransmission mechanism might be the best solution. For other applications only occasional reordering for a few messages might be done with a smaller buffer size and handling individual undelivered messages at application layer.

Another message-related mechanism may be implemented at the sidecar handling the connection of to a sending application. To avoid sending many potentially small messages, the connectivity sidecar can buffer and batch messages. This means that the payload of messages is combined to form larger messages. Especially for structured and text-based data formats, this also allows to implement compression mechanisms to reduce the transmission size of the batched messages. In case of XML or JSON-formatted payload, this enables highly efficient compressions of the payload by removing redundant information that would otherwise be delivered as part of the unbatched smaller messages. Overall, this allows to optimize the transmission bandwidth and message processing overhead at the cost of an increased delivery delay, introduced by the buffering and the time required for the data compression. To limit the maximum delay introduced by the buffering while waiting for a fixed number of messages, an upper time limit may be specified after which a batch is send out independent of its size. This mechanism also allows to reduce processing load on the broker infrastructure, where experiments with MQTT brokers showed that the processing is typically limited by the number of processed messages and not the size of the messages.

In addition to batching, also application-specific aggregation mechanisms can be implemented as part of this method that, e.g., aggregate multiple message payloads to single message payload. This, however, requires knowledge on the data format and data model used. Given a structured data format, an aggregation policy may be defined that extracts relevant numeric data fields from the MQTT messages and aggregates them for a predefined number of buffered messages. An example would be calculating mean, min, and max values along potentially other statistical properties for several hundred buffered messages and delivering only a single aggregate message. To configure such application-specific aggregations, the method proposes to expose an API to specify application-specific aggregation mechanism, for example, in the form of small programs or scripts to be run by the sidecar to perform the aggregation. A runtime and SDK concept for such scripts could be imagined.

In an extended version of the method, end-to-end delivery guarantees can be provided by implementing a buffering of application messages at the sending connectivity sidecar (connected to the application publishing data). This instance keeps QoS 1/2 messages available until all receiving instances indicated to the sidecar manager that the messages were delivered. This may happen implementing known acknowledgement mechanism, where large batches of messages are acknowledged simultaneously by a receiver. Alternatively, negative acknowledgements (NACKs) for individual messages or batches that were not delivered within a given timeframe, after the sending instance informed about a successful delivery to the broker, are used to trigger a resubmission of such a message. The sidecar manager informs the sending service about received messages and asks for necessary retransmissions. Once messages are acknowledged by all receivers, the sending service can remove them from its local buffer. The sidecar manager triggers this deletion by aggregated ACK messages.

This end-to-end delivery mechanisms implies substantial overhead to the message delivery and makes the sidecar manager a potential bottleneck of the overall system. Thus, its use must be carefully considered and is expected to be only applied in especially critical delivery scenarios or in cases of highly unreliable broker instances. It is an optional extension to the original approach that works without the additional message acknowledgement mechanisms.

The NOA (Namur Open Architecture) data diode concept can be implemented as integral part of the proposed solution. For this, policies can be defined in the type and content of data exchange that can pass the connectivity sidecars. Because the connectivity sidecars act as messaging proxies to the applications these policies can be enforced by rejecting messages, in best case, local to the application. As an additional layer of protection, also the receiving connectivity sidecar can do a similar filtering. In a containerized environment, for example, this would mean that messages can only leave a pod if the application in a pod is configured to be a data provider and, thus, can send data. In case of a pure data provider, no incoming MQTT data messages are passed on to the application by the connectivity sidecar, thereby implementing the data diode concept as integral part of the method. No additional containers or hardware boxes are required, when compared to other solutions.

The method hides the details of the data delivery from the applications. While the solution described assumes that, for example, MQTT is used for the delivery between connectivity sidecars, it can be also used to implement protocol translations. In this case, applications would still use, for example, MQTT to deliver and receive messages. Internally, the connectivity sidecar might, however, use a different delivery mechanism and/or protocol (e.g. AMQP). This way, the method may be used to realize a migration to a different delivery mechanism. In this case, the delivery semantics of, for example, MQTT would have to be translated to the used protocol or mechanism. For this, it can make use of redundant delivery mechanisms as well, like the descriptions related to diverse network paths. The main advantage of this approach is that it enables a migration to other delivery mechanisms, while keeping the applications untouched.

The sidecar manager can be realized in a centralized or distributed manner. While it is described as a logically centralized entity in this method and the illustrations, it can be implemented in a decentralized manner. In the decentralized case, multiple sidecar manager instances may run at any given time, where each instance manages a subset of the connectivity sidecars. The manager instances coordinate to manage consistent end-to-end delivery paths. The coordination among manager instances can follow any form of communication paradigm known from distributed software systems. In an extreme case, fully decentralized (peer-to-peer) mechanisms may be used. This way, the solution can be scaled in case of heavy load, which would be expected when, e.g., end-to-end delivery guarantees are required, and highly unreliable delivery paths are used. In this case, the acknowledgement mechanisms described before might put a high load on the sidecar manager, which as a result could be scaled by adding additional instances and dividing the load among them. In smaller setups, a single sidecar manager instance might be used. It is expected, however, that a redundant setup with two managers would be used in most cases.

The described mechanism achieves a reliable and low-latency delivery by redundant message delivery. This comes at the cost of an increased network traffic and CPU overhead. Depending on the network setup and mode, this load can add up on the same network or be distributed across different networks. Also, the coordination of connectivity sidecars with the sidecar manager causes additional network traffic and requires compute resources to execute the mechanisms for message duplication, etc. as well as the mechanisms of the sidecar manager. This overhead can be taken into consideration as an optimization criterion. For example, in case of changing network load, the number of parallel deliveries may be dynamically adjusted to avoid overload scenarios. In many cases, the available network bandwidth is not a concern and may be willingly traded for a reliable delivery based on unreliable delivery paths.

LIST OF REFERENCE SIGNS 1 first pod for first container 11 and first connectivity service 12
11 first container in pod 1
11a first software application in first container 11
12 first connectivity service in pod 1
13 buffer for messages 4 in pod 1
2 second pod for second container 21 and second connectivity service 22
21 second container in pod 2
21a second software application in second container 21
22 second connectivity service in pod 2
3 arrangement of broker instances
31-33 broker instances
4 message
4a-4c copies of message 4
5 pod for centralized management entity 51
51 centralized management entity
6 IoT edge gateway
7 cloud computing platform
8a, 8b networks
100 method for conveying messages
110 receiving ordered sequence of messages 4
111 blocking incoming messages destined for first application 11a
120 transmitting copies 4a-4c of message 4 to second connectivity service 22
121 aggregating multiple messages 4
122 buffering messages 4 until acknowledged
130 forwarding copy 4a-4c of message 4 to second application 21a
131 checking whether correct next message 4 already arrived
132 checking whether later message 4 in sequence arrived
133 buffering later message 4
134 checking whether next message 4 arrived before deadline
135 requesting retransmission
136 acknowledging receipt of message 4

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for conveying messages between a first software application in a first virtualized or compartmentalized execution environment in which the first software application runs and a second software application in a second virtualized or compartmentalized execution environment in which the second software application runs, the method comprising:
   receiving, by a first connectivity service associated with the first environment, an ordered sequence of messages sent by the first application;
   transmitting, by the first connectivity service, at least two copies of each message to a second connectivity service associated with the second environment;
   wherein the at least two copies are routed on at least partially redundant paths and wherein each copy is indicative of the position of the original message in the original ordered sequence;
   forwarding, by the second connectivity service, at least one copy of each message to the second application, in an order given by the ordered sequence of messages; and
   determining whether a copy of a first message that is next to be forwarded to the second application according to the original ordered sequence has not yet been received by the second connectivity service, and whether a copy of a second message that is later in the original ordered sequence has already been received, and based on this determination buffering the second message until the first message has been received and forwarded to the second application.

2. The method of claim 1, wherein at least two of the at least partially redundant paths pass through at least one of:
   different instances of a middleware broker that is configured to manage publish/subscribe communication between software applications;
   different routes within a network;
   different hardware interfaces to a network;
   different communication protocols; and
   different networks.

3. The method of claim 2, wherein the different instances of a middleware broker have been programmed differently, and/or are obtained from different suppliers.

4. The method of claim 1, further comprising: determining whether a copy of a message that is next to be forwarded to the second application according to the original ordered sequence is not received by the second connectivity service within a predetermined deadline after the previous message has been forwarded to the second application, and based on this determination, requesting retransmission of this message.

5. The method of claim 1, further comprising:
   acknowledging, by the second connectivity service, the receipt of every message from the first connectivity service; and
   buffering, by the first connectivity service, every message received from the first application until receipt of at least one copy of this message is acknowledged by the second connectivity service.

6. The method of claim 5, wherein acknowledgements and requests for retransmission are forwarded from the second connectivity service to the first connectivity service by a centralized management entity.

7. The method of claim 1, further comprising: aggregating, by the first connectivity service, multiple messages from the first application for transmission to the second connectivity service.

8. The method of claim 1, further comprising: blocking, by the first connectivity service, incoming messages destined for the first application.

9. The method of claim 1, wherein the first connectivity service is a sidecar associated with the first environment in a first pod.

10. The method of claim 1, wherein the second connectivity service is a sidecar associated with the second environment in a second pod.

11. The method of claim 1, wherein the first connectivity service is deployed in a separate pod on a same physical node as the first pod with the first environment.

12. The method of claim 1, wherein the second connectivity service is deployed in a separate pod on a same physical node as the second pod with the second environment.

13. The method of claim 1, wherein the first environment is deployed on an Internet of Things, IoT, edge gateway of an industrial plant, and wherein the first application is configured to receive sensor data captured during execution of an industrial process by the plant.

14. The method of claim 13, wherein the second environment, and/or at least one instance of a middleware broker that is configured to manage publish/subscribe communication between software applications, is deployed on a second edge device or on a cloud computing platform that is remote from the industrial plant.

15. A method for conveying messages between a first software application in a first virtualized or compartmentalized execution environment in which the first software application runs and a second software application in a second virtualized or compartmentalized execution environment in which the second software application runs, the method comprising:
   receiving, by a first connectivity service associated with the first environment, an ordered sequence of messages sent by the first application;
   transmitting, by the first connectivity service, at least two copies of each message to a second connectivity service associated with the second environment;
   wherein the at least two copies are routed on at least partially redundant paths and wherein each copy is indicative of the position of the original message in the original ordered sequence;
   forwarding, by the second connectivity service, at least one copy of each message to the second application, in an order given by the ordered sequence of messages; and
   determining whether a copy of a message that is next to be forwarded to the second application according to the original ordered sequence is not received by the second connectivity service within a predetermined deadline after the previous message has been forwarded to the second application, and based on this determination, requesting retransmission of this message.

16. The method of claim 15, further comprising:
   acknowledging, by the second connectivity service, the receipt of every message from the first connectivity service; and
   buffering, by the first connectivity service, every message received from the first application until receipt of at least one copy of this message is acknowledged by the second connectivity service.

17. The method of claim 16, wherein acknowledgements and the requests for retransmission are forwarded from the second connectivity service to the first connectivity service by a centralized management entity.

18. A method for conveying messages between a first software application in a first virtualized or compartmentalized execution environment in which the first software application runs and a second software application in a second virtualized or compartmentalized execution environment in which the second software application runs, the method comprising:

receiving, by a first connectivity service associated with the first environment, an ordered sequence of messages sent by the first application;

transmitting, by the first connectivity service, at least two copies of each message to a second connectivity service associated with the second environment;

wherein the at least two copies are routed on at least partially redundant paths and wherein each copy is indicative of the position of the original message in the original ordered sequence;

forwarding, by the second connectivity service, at least one copy of each message to the second application, in an order given by the ordered sequence of messages;

acknowledging, by the second connectivity service, the receipt of every message from the first connectivity service; and buffering, by the first connectivity service, every message received from the first application until receipt of at least one copy of this message is acknowledged by the second connectivity service.

19. The method of claim 18, wherein acknowledgements and requests for retransmission are forwarded from the second connectivity service to the first connectivity service by a centralized management entity.

\* \* \* \* \*